(12) United States Patent
Pelletier (10) Patent No.: US 7,965,645 B2
(45) Date of Patent: *Jun. 21, 2011

(54) SYSTEMS AND METHODS FOR ACCESSING VOICE TRANSMISSIONS

(75) Inventor: Jeffrey P. Pelletier, Westminster, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/815,346

(22) Filed: Jun. 14, 2010

(65) Prior Publication Data

US 2010/0246589 A1 Sep. 30, 2010

Related U.S. Application Data

(63) Continuation of application No. 11/001,887, filed on Dec. 1, 2004, now Pat. No. 7,738,384.

(60) Provisional application No. 60/555,603, filed on Mar. 23, 2004.

(51) Int. Cl.
*H04J 3/14* (2006.01)
*H04L 12/28* (2006.01)
*H04L 12/56* (2006.01)

(52) U.S. Cl. ........................................ 370/241; 370/401

(58) Field of Classification Search ........................ None
See application file for complete search history.

(56) References Cited

U.S. PATENT DOCUMENTS

| | | | | |
|---|---|---|---|---|
| 6,678,270 B1 * | 1/2004 | Garfinkel | | 370/392 |
| 7,023,854 B2 * | 4/2006 | Garfinkel | | 370/392 |
| 7,123,710 B2 * | 10/2006 | Ravishankar | | 379/221.1 |
| 7,626,980 B1 * | 12/2009 | Croak et al. | | 370/352 |
| 7,738,384 B2 * | 6/2010 | Pelletier | | 370/241 |
| 2001/0052081 A1 * | 12/2001 | McKibben et al. | | 713/201 |
| 2002/0009973 A1 * | 1/2002 | Bondy et al. | | 455/67.2 |
| 2002/0051518 A1 | 5/2002 | Bondy et al. | | |
| 2002/0097724 A1 * | 7/2002 | Halme et al. | | 370/392 |
| 2003/0091026 A1 * | 5/2003 | Penfield et al. | | 370/352 |
| 2003/0156576 A1 | 8/2003 | Crutcher et al. | | |
| 2003/0219103 A1 * | 11/2003 | Rao et al. | | 379/32.05 |
| 2003/0227917 A1 * | 12/2003 | Maher et al. | | 370/392 |
| 2004/0047451 A1 | 3/2004 | Barker et al. | | |
| 2004/0202295 A1 * | 10/2004 | Shen et al. | | 379/112.01 |
| 2004/0240439 A1 * | 12/2004 | Castleberry et al. | | 370/389 |
| 2006/0212933 A1 | 9/2006 | Scoggins et al. | | |
| 2009/0262723 A1 | 10/2009 | Pelletier et al. | | |
| 2009/0268615 A1 | 10/2009 | Pelletier | | |

OTHER PUBLICATIONS

"TeleStrategies: ISS World 2003; IntelligenceSupport Systemsfor Lawful Interception and Internet Surveillance", McLean, VA Nov. 13-14, 2003, 1-362.

* cited by examiner

*Primary Examiner* — Donald L Mills
(74) *Attorney, Agent, or Firm* — John C. Heuton (57) ABSTRACT

Various systems and methods for intercepting transmissions are disclosed. In one embodiment, a system is disclosed that includes a media gateway communicably coupled to a soft switch and an acquisition facility. A first processor and a first computer readable medium are associated with the soft switch. The computer readable medium includes instructions executable by the processor to receive a transmission originating from a first communicator and indicating at least a second communicator, and to direct the transmission to the acquisition facility via the media gateway. A second processor and second computer readable medium are included, and the second computer readable medium includes instructions executable by the second processor to direct the transmission from the media gateway to the second communicator such that direction of the transmission to an acquisition facility is obscured from at least the second communicator. Various other systems and methods are also disclosed.

15 Claims, 4 Drawing Sheets

SYSTEMS AND METHODS FOR ACCESSING VOICE TRANSMISSIONS

CROSS REFERENCE TO RELATED CASES

The present application is a continuation of application Ser. No. 11/001,887, now U.S. Pat. No. 7,738,384, filed Dec. 1, 2004, which claims priority to U.S. Provisional Patent Application No. 60/555,603 entitled "Systems and Methods for Intercepting Communications" filed by Pelletier et al. on Mar. 23, 2004. The entirety of the aforementioned references is incorporated herein by reference for all purposes.

BACKGROUND OF THE INVENTION

The present invention provides systems and methods for monitoring various transmissions. More particularly, the present invention provides various methods for monitoring real time transmissions passed over a Internet Protocol (IP) network.

In some cases it has been deemed desirable to provide third party access to voice communications. Securing third party access has typically included obtaining a court order allowing for a wire tap of a particular telephone number, and providing the court order to a telecommunications company servicing the particular telephone number. Based on the court order, the telecommunications company places a tap at the central office of the telephone company. The tap provides a copy of communications ongoing in relation to the particular telephone number to the entity providing the court order to the telecommunications company. Such an approach, however, is unworkable in the increasing complexity and diversity of the communications market.

Hence, among things, there exists a need in the art for advanced systems and methods facilitating third party access to telephonic communications.

BRIEF SUMMARY OF THE INVENTION

The present invention provides systems and methods for monitoring various transmissions. More particularly, the present invention provides various methods for monitoring real time transmissions passed over a Internet Protocol (IP) network.

In various cases, the present invention can be applied to a voice over IP (VOIP) network to monitor audio transmissions ongoing in relation to a selected endpoint. In such cases, an audio transmission between two or more endpoints is detected, and at least a portion of the audio transmission is directed to an acquisition facility where the audio transmission is monitored. In some instances, the monitoring can be performed without introducing observable changes to the audio transmission passing between selected endpoints. Thus, for example, the systems and methods can be implemented such that any time delay or other indication of the monitoring is not detectable at any of the endpoints. Thus, in some cases, the systems and methods of the present invention can be used for implementing monitoring of VOIP network activity consistent with the requirements of the United States Cooperative Assistance to Law Enforcement Act. Application of the invention to a VOIP network can include monitoring transmissions from IP to IP, and to/from IP and a PSTN or other border network.

Some embodiments of the present invention provide systems for intercepting audio transmissions. Such systems include a media gateway that is communicably coupled to a soft switch and an acquisition facility. A processor and a computer readable medium are associated with the soft switch. The associated computer readable medium includes instructions executable by the processor to receive a transmission originating from a first communicator and indicating at least a second communicator, and to direct the transmission to the acquisition facility via the media gateway such that transmission to the acquisition facility is obscured from the second communicator.

A processor and computer readable medium are also associated with the media gateway. This computer readable medium includes instructions executable to direct the transmission from the media gateway to the second communicator. In particular instances, the media gateway provides IP signals to the soft switch and time division multiplex signals to a public switched telephone network. In various cases obscuring the acquisition process is done by selecting a media gateway randomly, and/or by selecting a media gateway that would handle both transmissions selected for acquisition and those not selected for acquisition. Thus, as just one example, transmissions from one communicator may always be handled by a particular media gateway or group of media gateways. Each of these media gateways can be capable of directing the transmission for acquisition and also to a selected destination communicator, as well as directing the transmission to the selected communicator without providing for acquisition.

In some cases, the computer readable medium associated with the soft switch further includes instructions executable to determine that the transmission originating from the first communicator is selected for acquisition. This computer readable medium can also include a list of communicators for which associated transmissions are to be acquired. In such cases, the computer readable medium can further include instructions executable to access the list of communicators for which associated transmissions are to be acquired.

The transmission can be a real time transmission such as, for example, audio, video, and/or text messaging transmissions. The communicators can be, but are not limited to, wired telephones, cellular telephones, audio enabled personal computers, audio enabled personal digital assistants, voice over internet protocol telephones, video enabled wired telephones, video enabled cellular telephones, video enabled voice over internet protocol telephones, video enabled personal computers, and/or a video enabled personal digital assistants.

Other embodiments of the present invention provide systems and methods for monitoring transmissions. Such methods include a media gateway that is communicably coupled to a first communicator, a second communicator, and a central office. The central office is operable to transfer communications selected for acquisition and operable to transfer communications not selected for acquisition. A processor and computer readable medium are associated with the central office, and the computer readable medium includes instructions executable by the processor to: receive a transmission originating from the first communicator; direct the transmission to the acquisition facility; and direct the transmission from the central office to the second communicator via the media gateway such that it masks the occurrence of the transmission from the central office to the acquisition facility.

Yet other embodiments of the present invention provide methods for monitoring IP transmissions that can include, for example, audio, video, and/or text messaging. In some particular examples, the methods include monitoring audio communications passed via a VOIP network. Such methods include receiving an audio transmission at a soft switch. The audio transmission is initiated by a first communicator, and it indicates a first IP address associated with the first communicator and a second IP address associated with a second communicator. The methods further include accessing a computer readable medium that includes a list of communicators selected for acquisition, and identifying either one or both of the first communicator or the second communicator on the list of communicators selected for acquisition. In addition, the audio transmission is directed to a media gateway associated with an acquisition facility. The audio transmission is prepared for dispatch to the second communicator which includes directing the audio transmission such that any acquisition process is obscured from one or both of the first and second communicators. The audio transmission is then directed to the second IP address associated with the second communicator, and to an acquisition facility.

In some cases, the methods further include receiving a request to acquire transmissions associated with the first communicator. In various cases, directing the audio transmission to the acquisition facility includes formatting the audio transmission as a time division multiplexed signal. In other cases, the information is processed in a standard IP or other format.

Yet further embodiments of the present invention provide media gateways that include a processor and a computer readable medium. The computer readable medium includes instructions executable by the processor to receive a real time transmission that includes an indication of a source and a destination and is associated with a communicator. The instructions are further executable to direct at least a first portion of the real time transmission to an acquisition facility, to prepare at least a second portion of the real time transmission for dispatch to the destination, and to direct the at least a second portion of the real time transmission to the destination such that the occurrence of the acquisition process is obscured or masked from one or both of the source and the destination.

In some cases, the instructions executable by the processor to direct the second portion of the real time transmission to the destination include instructions executable to: provide information associated with the second portion of the real time transmission to a soft switch; receive communication information from the soft switch; and provide information associated with the real time transmission to the destination in accordance with the communication information from the soft switch. In particular cases, the instructions executable by the processor to direct the first portion of the real time transmission to the destination include instructions executable to receive information originating from the destination in accordance with the communication information from the soft switch.

Yet further embodiments of the present invention provide methods for intercepting real time audio transmissions. The methods include receiving at a soft switch, a transmission that includes a signaling component indicating a first IP address associated with a first communicator and a second IP address associated with a second communicator; determining that the first communicator is selected for acquisition; and directing the transmission to a media gateway. At the media gateway the transmission is directed to the second IP address associated with the second communicator such that the directed transmission obscures the occurrence of any acquisition process. Further, the transmission is directed to an acquisition facility at the media gateway.

Additional embodiments of the present invention provide methods for intercepting various types of transmissions that are communicated using, for example, IP or other communication format. In such methods, detection can be triggered by an origination or destination indicator. These indicators can be, but are not limited to, a uniform record locator (URL), a telephone number, an IP address, and/or the like. Thus, embodiments of the present invention can be used to detect a broad array of transmission types using a broad array of indicators.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention provides systems and methods for monitoring various transmissions. More particularly, the present invention provides various methods for monitoring real time transmissions passed over an Internet Protocol (IP) network.

In various cases, the present invention can be applied to a voice over IP (VOIP) network to monitor real time transmissions ongoing in relation to one or more selected endpoints. As used herein, the term endpoint can be a logical location on a communication network such that communications ongoing in relation to the logical location can be targeted, a physical location such that communications emerging from the geographic location are targeted, and/or an individual or entity such that communications associated with the individual or entity are targeted. In some cases, endpoints are associated with communication devices that can include, but are not limited to, a wired telephone, a cellular telephone, an audio enabled personal computer, an audio enable personal digital assistant (PDA), a voice over internet protocol telephone, a video enable wired telephone, a video enable cellular telephone, a video enabled voice over internet protocol telephone, a video enabled personal computer, and/or a video enable PDA. As used herein, a communicator is used in its broadest sense to include endpoints and/or communication devices. Thus, a communicator can be a location (physical or logical) where a transmission is sent to/from, an entity or individual associated with communications, and/or a communication device capable of receiving and/or sending such transmissions.

As just one example, an audio transmission such as a VOIP telephone call ongoing between two endpoints can be detected, and at least a portion of the audio transmission is directed to an acquisition facility where the audio transmission is monitored. Based on the disclosure provided herein, one of ordinary skill in the art will appreciate that the systems and methods can be applied to monitor real time transmissions ongoing between a multiplicity of endpoints such as, for example, a conference call.

As used herein, an acquisition facility is any location, equipment, and/or software capable of receiving and recording real time transmissions. Thus, for example, where the real time transmission is an audio transmission the acquisition facility can be a tape recorder, a digital recorder, a server, a law enforcement location equipped with recording equipment, and/or the like.

Figure 1:
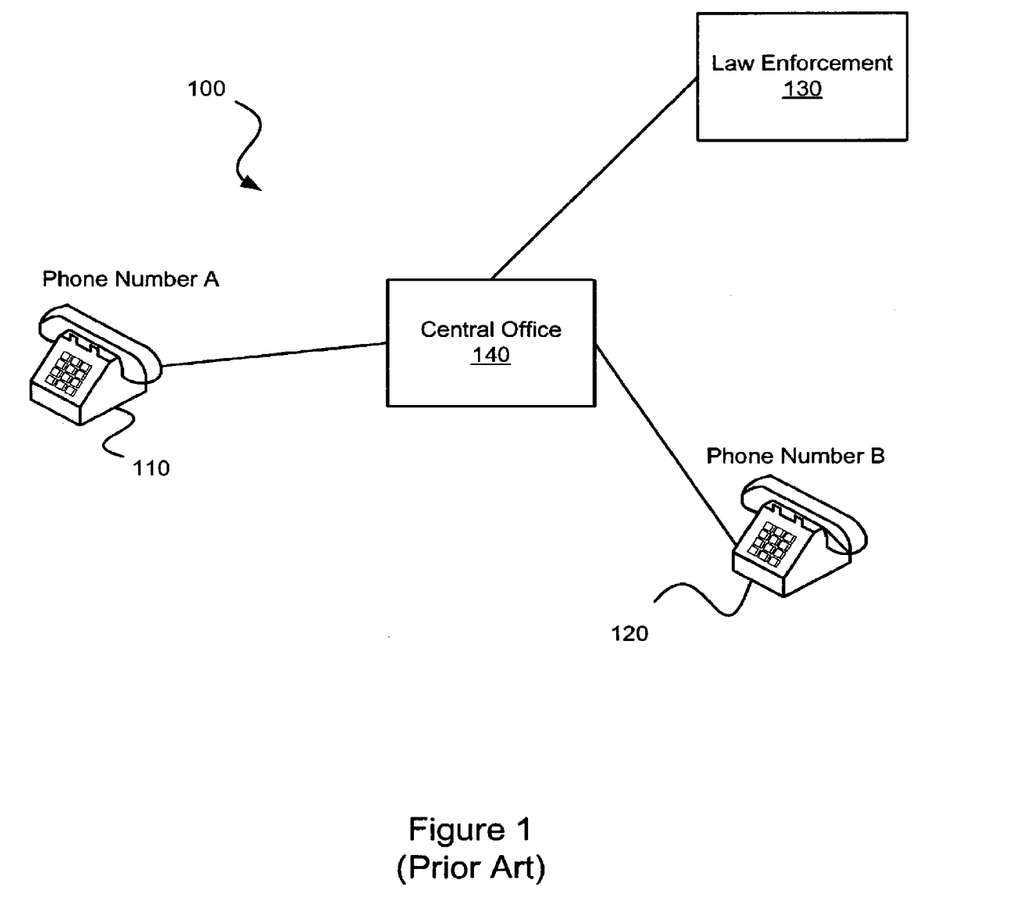
FIG. 1 depicts an existing system for monitoring audio transmissions.

Turning to FIG. 1, an existing system 100 for monitoring audio transmissions is illustrated. System 100 includes two or more telephones 110, 120 each physically coupled to a central office 140. Each of telephones 110, 120 is associated with a respective telephone number. System 100 further includes physical coupling of a law enforcement agency 130 to central office 140.

In operation, law enforcement agency 130 obtains a court order allowing it to monitor communications ongoing in relation to one or more of telephones 110, 120. Law enforcement agency 130 then presents the court order to a telecommunications company responsible for central office 140. The telecommunications company then implements monitoring of the audio transmissions occurring in relation to the designated telephone number. In particular, where the telephone number associated with telephone 110 is selected for acquisition, a telephone call either to or from telephone 110 is flagged at central office 140. A copy of the flagged telephone call is secured and provided to law enforcement agency 130. Such an approach works in a standard telecommunications system that relies on ubiquitous telephone numbers and passage through a central office. Such an approach is not effective for a growing variety of telephony services.

Figure 2A:
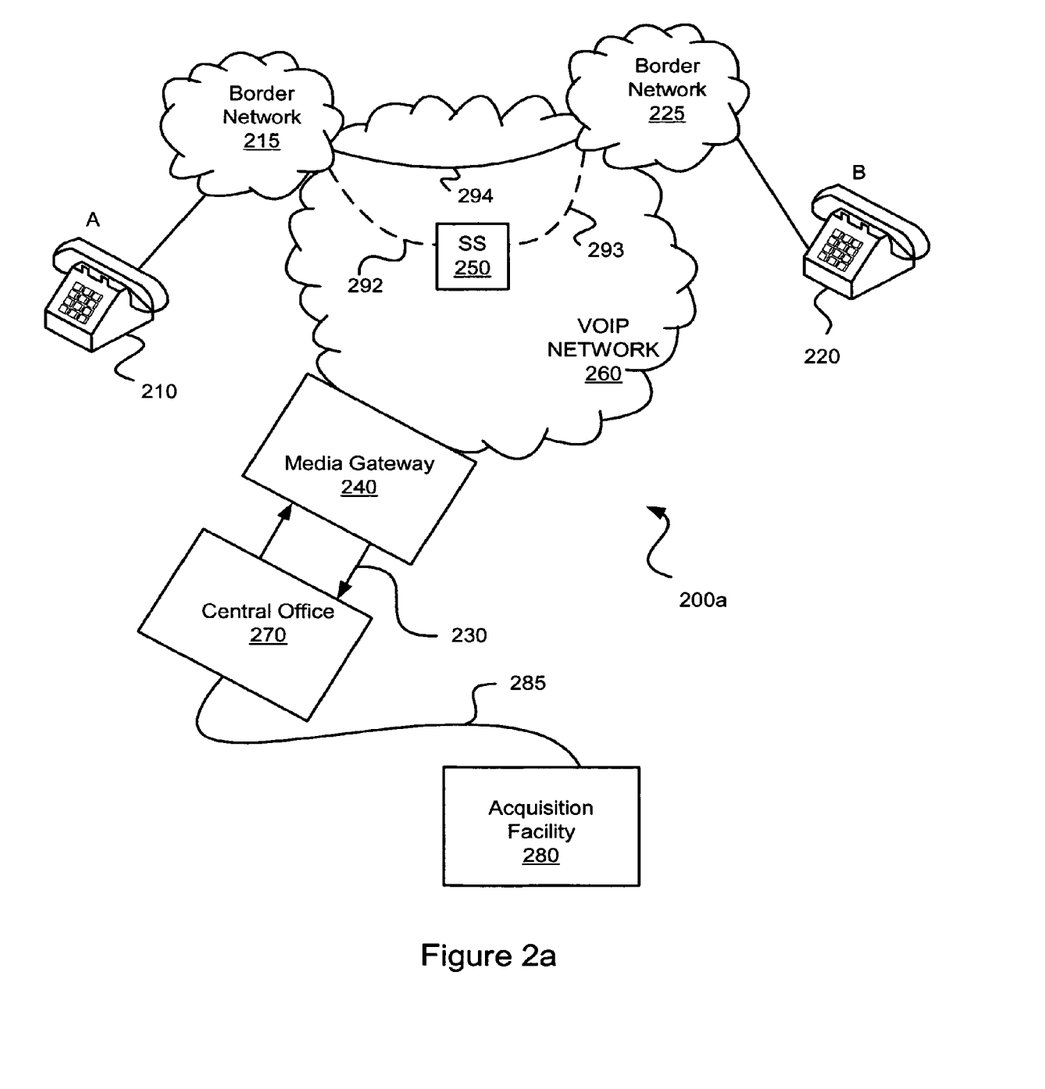
FIG. 2 depict a system operable in relation to the present invention for monitoring transmissions.

Turning to FIG. 2, and in particular to FIG. 2a, a system 200 for monitoring transmissions in accordance with some embodiments of the present invention is illustrated. System 200 includes a VOIP network 260 that includes one or more soft switches 250 capable of routing various transmissions across VOIP network 260. System 200 further includes one or more communicators 210, 220 capable of accessing VOIP network 260 either directly or indirectly. One or more media gateways 240 are included, along with one or more border networks 215, 225. Border networks 215, 225 can be any network capable of communicably coupling one or more communicators 210, 220 with VOIP network 260. Thus, border networks can include Wi-Fi points, Internet Service Provider (ISP) networks, public switched telephone networks (PSTN), enterprise networks, virtual private networks (VPN), and/or the like. In some cases, a communicator is capable of direct coupling to VOIP network 260, and in such a case does not communicate via a border network. As used herein, the term communicably coupled is used in its broadest sense to mean any type of coupling whereby information can be passed between two or more points, either directly or via intermediary equipment. Thus, for example, communicable coupling can include wired and/or wireless coupling. System 200 also includes a central office 270 communicably coupled to media gateway via an interface 230, and to an acquisition facility 280 via an interface 285.

In a standard operation, a transmission is initiated from, for example, communicator 210 that is directed to communicator 220. The transmission is received at border network 215 and directed to soft switch 250. The transmission indicates the originating communicator 210 and the destination communicator 220. Soft switch 250 sets up signaling 292, 293 indicating a media path 294 by which media associated with the transmission is passed. As will be appreciated by one of ordinary skill in the art, media path 294 can be a direct connection between border networks 215, 225 or can include a number of hops or nodes spaced between communicator 210 and communicator 220. Based on the disclosure provided herein, one of ordinary skill in the art will appreciate that a large number of communicators can be associated with VOIP network 260, either directly or through a border network.

In accordance with some embodiments of the present invention, soft switch 250 is associated with a computer readable medium that includes a list of communicators and/or endpoints designated for acquisition. For the purpose of the following description, and that of the claims below, endpoints and communicators are used interchangeably to mean any points communicably coupled to VOIP network 260 that are capable of being acquired (i.e., monitored). In some cases, the list of communicators includes a list of IP addresses associated with particular communication devices, locations and/or users. In addition, the list of communicators can include a list of telephone numbers and/or other information capable of designating the source and/or destination of a particular transmission. Upon receiving a transmission, soft switch 250 accesses the list of communicators designated for acquisition to determine if any communicator indicated by the received transmission is included on the list. The communicators indicated by the transmission can include communicators identified as the source or destination of the transmission.

Figure 2B:
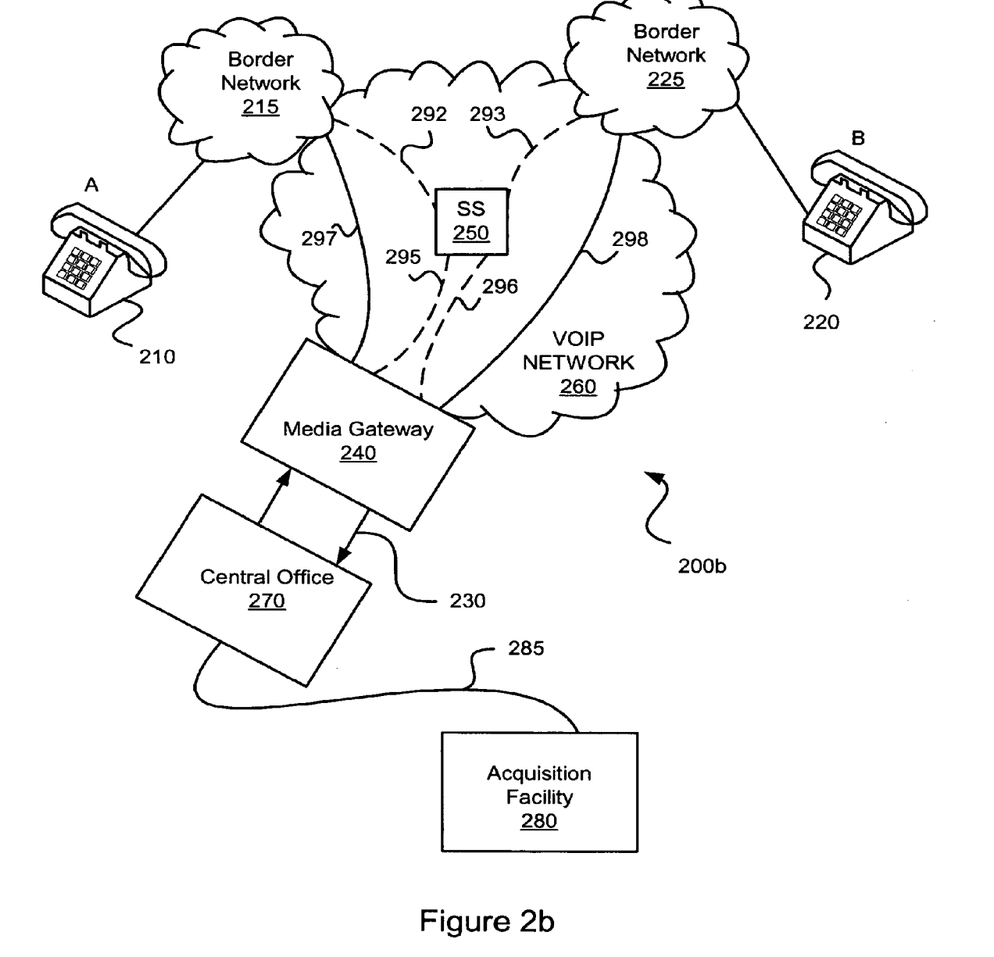

As shown in FIG. 2b, where it is determined that a communicator associated with a received transmission is included on the list of communicators designated for acquisition, signaling 292, 295 is set up between media gateway 240 and border network 215 associated with the originating communicator 210. Media 297 associated with the transmission is then directed from border network 215 to media gateway 240, rather than directly to border network 225 as may be the case where acquisition is not called for.

In turn, media gateway 240 forks the transmission (i.e., a tap is performed by making a copy of the transmission and directing the copy to a secondary location), and the forked portion of the transmission is directed to acquisition facility 280 via central office 230. In another example, central office 230 forks the transmission, with the forked portion of the transmission being directed to acquisition facility 280. In addition, soft switch sets up signaling 296, 293 such that media gateway 240 can communicate media 298 associated with the transmission to the original destination, communicator 220, via border network 225. In one embodiment of the present invention, interface 230 is a time division multiplex interface, central office 270 is the central office of a PSTN, and interface 285 is a JD-STD-25 interface. Based on the disclosure provided herein, one of ordinary skill in the art will recognize other data formats that can be used in accordance with the present invention. Further, based on the disclosure provided herein, one of ordinary skill in the art will recognize that media gateway 240 can communicate with acquisition facility 280 directly, or via an intermediary other than central office 270 depending upon the configuration of the network. In some cases, acquisition facility 280 includes access to one or more keys allowing for access to transmissions detected in an encrypted format.

At this point, the ongoing acquisition may be detectable at either communicator 210 or communicator 220. In particular, communicator 210 may be aware that it is communicating directly with media gateway 240 rather than another more direct path to communicator 220. Similarly, communicator 220 may be aware that it is also communicating directly with media gateway 240, rather than another more direct path to communicator 210. Further, where all acquisition is accomplished via media gateway 240, a user may know that a particular transmission has been selected for acquisition by virtue of the fact that the communication is being carried via media gateway 240.

In some cases where it is desired to mask or obscure the acquisition process from one or both of communicators 210, 220, media gateway 240 can always be selected to carry, for example, transmissions originating from communicator 210 whether the transmission is selected for acquisition or not. Thus, determining that a transmission is being carried via media gateway 240 does not necessarily indicate that the transmission has been selected for acquisition. This approach obscures and/or masks the occurrence of an acquisition process.

As one example of the foregoing embodiment, soft switch 250 can receive a request to complete a transmission between communicator 210 and communicator 220. Soft switch 250 can determine based on the indication of one or both of communicator 210 and communicator 220 that the transmission is selected for acquisition. Soft switch 250 can then define a transmission route that includes media gateway 240. Similarly, where a transmission is not selected for acquisition, soft switch 250 defines a transmission route that includes media gateway 240. Based on the disclosure provided herein, one of ordinary skill in the art will appreciate a number of other exemplary scenarios that can be performed in accordance with the aforementioned embodiment of the present invention. For example, it may be that soft switch 250 is not used, but rather that equipment associated with border network 215 provides the routing functionality.

In some embodiments of the present invention, a number of media gateways (including media gateway 240) are capable of communicating transmissions to acquisition facility 280. These media gateways can also be commonly used in carrying transmissions between communicators even where the transmissions are not selected for acquisition. Similar to the previously described reuse of media gateway 240 to carry transmissions not selected for acquisition, the reuse of multiple media gateways further obscures or masks any acquisition process from communicators 210, 220. In one particular embodiment, a communicator such as communicator 210 always transmits via one or a select group of media gateways—one or more of which is capable of communicating a transmission to acquisition facility 280. Thus, when a transmission is selected for acquisition, the route selected to carry the transmission will not be out of the ordinary, and the acquisition process will be obscured.

As one example of the foregoing embodiment, soft switch 250 can receive a request to complete a transmission between communicator 210 and communicator 220. Soft switch 250 can determine based on the indication of one or both of communicator 210 and communicator 220 that the transmission is selected for acquisition. Soft switch 250 can then define a transmission route that includes one of a number of media gateways capable of facilitating the acquisition. Similarly, where the transmission is not selected for acquisition, soft switch 250 defines a transmission route that randomly includes one or more of the media gateways capable of facilitating acquisition. Again, based on the disclosure provided herein one of ordinary skill in the art will appreciate a number of other exemplary scenarios that can be performed in accordance with the aforementioned embodiment of the present invention.

In yet other embodiments of the present invention, transmissions are typically routed such that they are carried by one or more media gateways—or in some cases by a variety of network nodes including, but not limited to, media gateways. Further, these media gateways are randomly assigned for routing purposes such that it would be uncommon for two consecutive transmissions from communicator 210 to communicator 220 to share a common path. When an acquisition is desired, the transmission is routed via a media gateway capable of communicating with an acquisition facility, and the prior randomness of routing obscures or masks the fact that acquisition has been selected.

As one example of the foregoing embodiment, soft switch 250 can receive a request to complete a transmission between communicator 210 and communicator 220. Soft switch 250 can determine based on the indication of one or both of communicator 210 and communicator 220 that the transmission is selected for acquisition. Soft switch 250 can then define a transmission route that includes a media gateways capable of facilitating the acquisition. Similarly, where the transmission is not selected for acquisition, soft switch 250 defines a purposely random transmission route that at least occasionally includes one or more media gateways capable of facilitating acquisition. Where acquisition is selected, a random pattern of media gateways capable of acquisition can be selected. Again, based on the disclosure provided herein one of ordinary skill in the art will appreciate a number of other exemplary scenarios that can be performed in accordance with the aforementioned embodiment of the present invention. Further, it should be recognized that acquisition facility 280 may be part of VOIP network 260. In such a case, acquisition facility 280 can be assigned a number of node identifications that can be used in routing even when a transmission has not been selected for acquisition.

In yet other embodiments of the present invention, at least in part to avoid detection, media gateway 240 can replace an indicator of media gateway 240 included with transmission 298 destined for communicator 220 with the corresponding indicator of communicator 210. Further, signaling 293 can be modified to avoid and/or obscure detection. Similarly, media gateway 240 can replace an indicator (in some cases, the IP address of media gateway 240) of media gateway 240 included with transmission 297 destined for communicator 220 with the corresponding indicator of communicator 210, and signaling 292 can be modified to avoid and/or obscure detection. In some cases, obscuring detection includes using media gateway 240 as a transfer point for transmissions passing through VOIP network 260 both when acquisition is ongoing, and when acquisition is not ongoing. Such a random use of media gateway 240 limits the ability to detect that acquisition is ongoing, and rather looks like a standard connection such as that depicted in FIG. 2a with media gateway acting as a node in media path 294.

Figure 3:
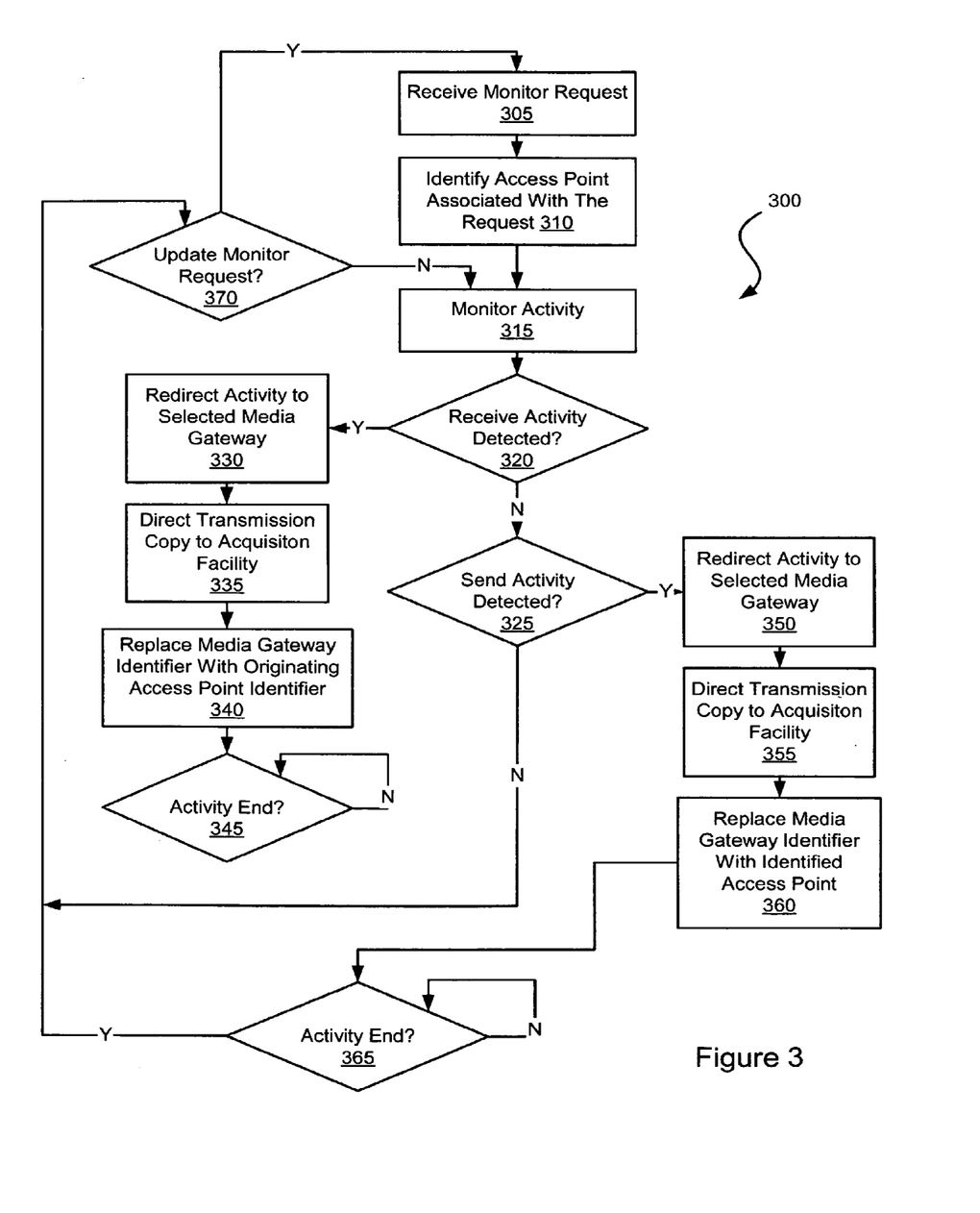
FIG. 3 is a flow diagram illustrating a method in accordance with various embodiments of the present invention.

Turning to FIG. 3, a flow diagram 300 illustrates a method in accordance with some embodiments of the present invention for acquiring a transmission in relation to system 200. Following flow diagram 300, a request to monitor (i.e., acquire) one or more transmissions associated with one or more communicators is received (block 305). In some cases, this request is provided by a law enforcement agency that has obtained a court order allowing for the monitoring of transmissions occurring in relation to a particular communicator. This request can be provided to an entity having some control over the operations of VOIP network 260 and/or one or more border networks 215, 225.

Upon receiving the request (block 305), a media gateway occasionally utilized in relation to transmissions associated with the designated communicator is identified (block 310). This can include, for example, updating a list of communicators selected for acquisition and associated media gateways. This computer readable medium is accessible by soft switch 250. Thus, in some cases, this computer readable medium can be implemented as part of soft switch 250, or available as a resource somewhere on VOIP network 260, border networks 215, 225, and/or acquisition facility 280. Based on the disclosure provided herein, one of ordinary skill in the art will recognize a number of other physical and/or logical locations for the computer readable medium.

Activity associated with VOIP network 260 and/or border networks 215, 225 is monitored to determine if any of the activity is ongoing in relation to a communicator selected for acquisition (block 315). This can include accessing the aforementioned computer readable medium by soft switch 250, and determining that a requested transmission is associated with a communicator included on the list of communicators selected for acquisition. Where a match is found and the transmission is being received by the matching communicator (block 320), the transmission including media and signaling is redirected to the media gateway associated with the selected communicator (block 330). The transmission is also forwarded to the acquisition facility where it is recorded (block 335), and directed from the media gateway to the selected communicator with the IP address of the media gateway replaced with that of the sending communicator (block 340). Acquisition of the transmission is continued until an end of the transmission is detected (block 345).

Alternatively, where a match is found and the transmission is being sent by the matching communicator (block 325), the transmission including media and signaling is redirected to the media gateway associated with the selected communicator (block 350). The transmission is also forwarded to the acquisition facility where it is recorded (block 355), and directed from the media gateway to the receiving communicator with the IP address of the media gateway replaced with that of the selected communicator (block 360). Acquisition of the transmission is continued until an end of the transmission is detected (block 365).

Where no match is found (blocks 320, 325) or when a monitoring activity ends (blocks 345, 365), it is determined if an updated monitoring request is pending (block 370). Where no updated monitoring request is pending, activity monitoring (blocks 315-365) continues as previously described. Alternatively, where an updated monitoring request is pending (block 370), the updated monitoring request is satisfied by adding or deleting one or more communicators to/from the list of communicators selected for acquisition.

Based on the discussion provided herein, one of ordinary skill in the art will recognize that a number of acquisition processes (threads) can be ongoing in parallel. Further, monitoring of other transmissions passing through the network(s) can be monitored while various transmissions are being acquired.

The invention has now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A soft switch comprising:
   a first interface operable to receive signaling information associated with a communication session between a first communication device and a second communication device;
   a second interface communicably coupling the softswitch to a plurality of media gateways communicably coupled to an acquisition facility; and
   a processor configured to randomly select one of the plurality of media gateways to communicate media between the first communication device and the second communication device during the communication session, wherein the selected media gateway is operable to forward the media to the acquisition facility and the transmission to the acquisition facility is obscured from the second communication device at least in part through random selection of the media gateway.

2. A soft switch as recited in claim 1, wherein the soft switch is operable to direct the selected media gateway to communicate the media to the acquisition facility and to direct the selected media gateway to communicate the media to a second communication device.

3. A soft switch as recited in claim 1, further comprising:
   a computer readable medium having stored thereon a list of communication devices, wherein the processor analyzes the list to determine whether the communication session should be acquired.

4. A soft switch of claim 1, wherein the communication session comprises a real time transmission.

5. A soft switch of claim 4, wherein the real time transmission is selected from a group consisting of:
   an audio transmission, and
   a video transmission.

6. A soft switch of claim 1, wherein the first communication device comprises a device selected from a group consisting of:
   a wired telephone,
   a cellular telephone,
   an audio enabled personal computer,
   an audio enabled personal digital assistant,
   a voice over internet protocol telephone,
   a video enabled wired telephone,
   a video enabled cellular telephone,
   a video enabled voice over internet protocol telephone,
   a video enabled internet protocol communication device,
   a video enabled personal computer, and
   a video enabled personal digital assistant.

7. A soft switch as recited in claim 1, wherein the at least one communication device is identified using one or more of an IP address, a telephone number, and a uniform record locator.

8. A soft switch as recited in claim 1, wherein the processor receives an indicator of the selected media gateway and replaces the indicator of the selected media gateway with an indicator of at least one of the first communication device and the second communication device during the communication session.

9. A soft switch comprising:
   a first interface operable to receive signaling information associated with a communication session between a first communication device and a second communication device;
   a second interface communicably coupling the softswitch to at least one media gateway; and
   a processor configured to create signaling instructions for use by the media gateway, the first communication device and the second communication device to direct the communication session to occur over the media gateway such that media associated with the communication session is transmitted between the first communication endpoint and the second communication endpoint via the media gateway, wherein indication of the media gateway is obscured from the first communication device and the second communication device in the signaling instructions.

10. A soft switch as recited in claim 9, further comprising: a computer readable medium having stored thereon a list of communication devices, wherein the processor analyzes the list to determine whether the communication session should be acquired.

11. A soft switch of claim 9, wherein the communication session comprises a real time transmission.

12. A soft switch of claim 11, wherein the real time transmission is selected from a group consisting of:
   an audio transmission, and
   a video transmission.

13. A soft switch of claim 9, wherein the first communication device comprises a device selected from a group consisting of:
   a wired telephone,
   a cellular telephone,
   an audio enabled personal computer,
   an audio enabled personal digital assistant,
   a voice over internet protocol telephone,
   a video enabled wired telephone,
   a video enabled cellular telephone,
   a video enabled voice over internet protocol telephone,
   a video enabled internet protocol communication device,
   a video enabled personal computer, and
   a video enabled personal digital assistant.

14. A soft switch as recited in claim 9, wherein the first communication device is identified using one or more of an IP address, a telephone number, and a uniform record locator.

15. A soft switch as recited in claim 9, wherein the processor is further configured to receive an indicator of the at least one media gateway and replace the indicator of the media gateway with an indicator of at least one of the first communication device and the second communication device during the communication session.

* * * * *